(No Model.) 2 Sheets—Sheet 1.
M. T. REEVES, J. N. KAILOR & J. N. D. REEVES.
THRASHING MACHINE.
No. 550,027. Patented Nov. 19, 1895.
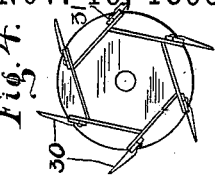
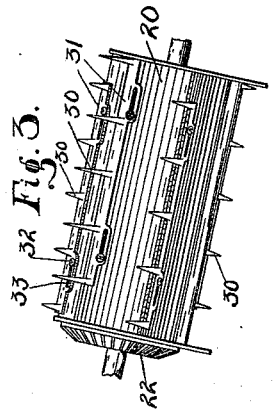
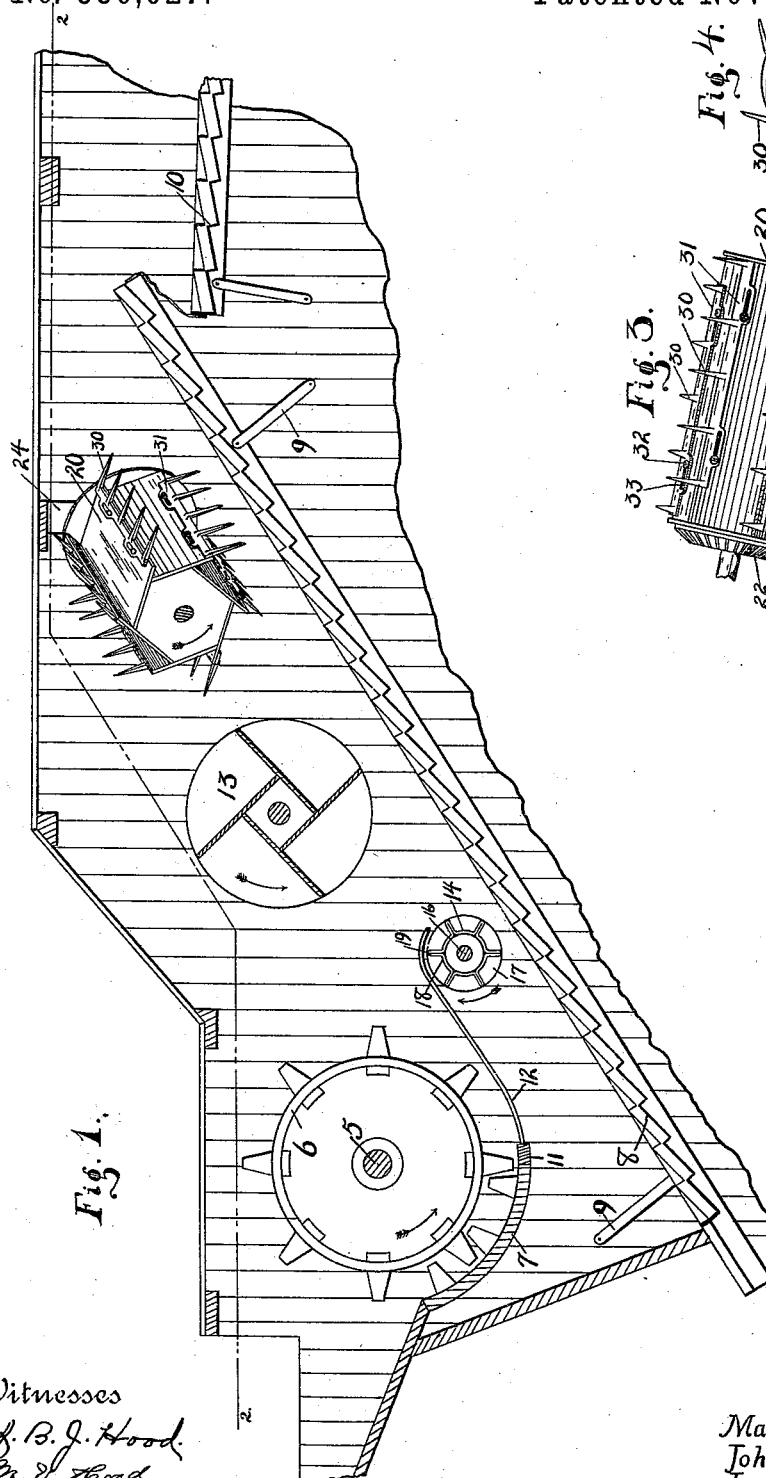
Witnesses
J. B. J. Hood.
M. J. Hood
Inventors
Marshal T. Reeves.
John N. Kailor.
James N. D. Reeves.
By Attorneys
H. P. Hood & Son.

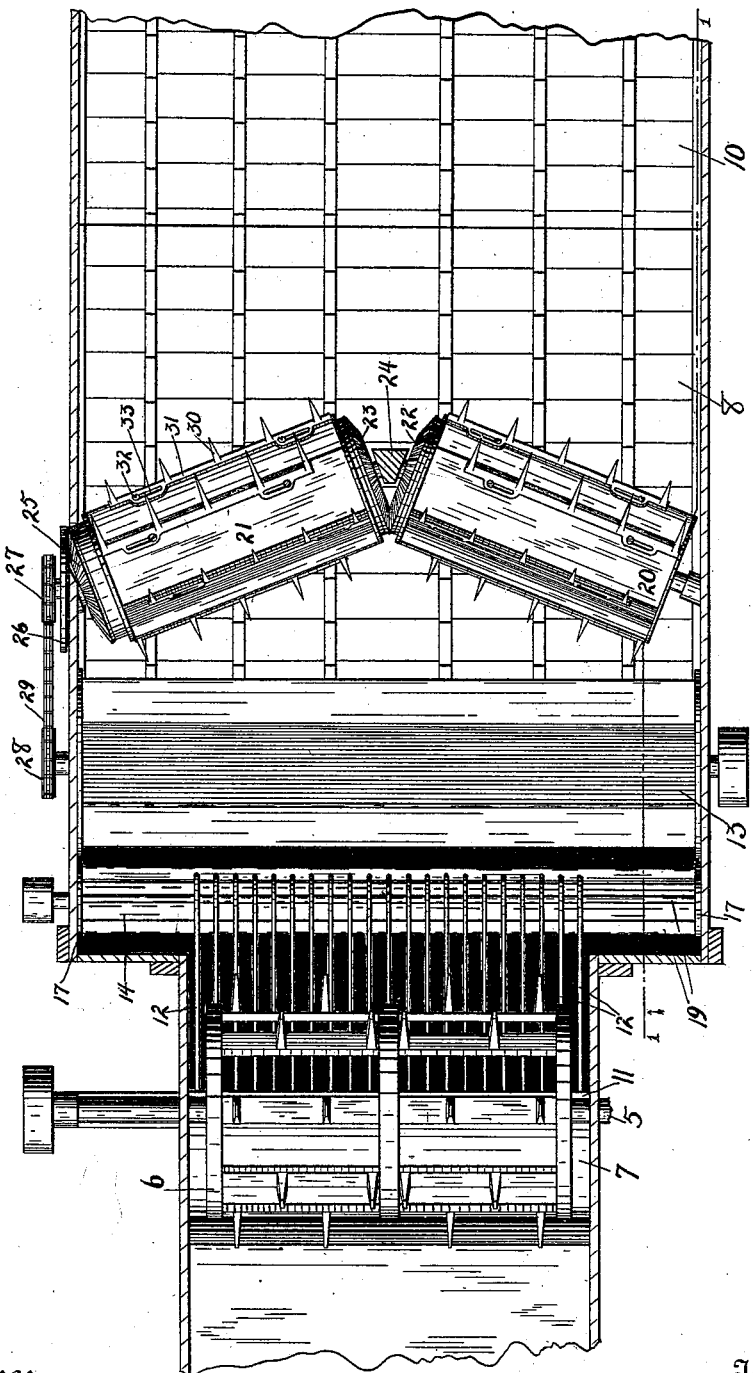

UNITED STATES PATENT OFFICE.

MARSHAL T. REEVES, JOHN N. KAILOR, AND JAMES N. D. REEVES, OF COLUMBUS, INDIANA, ASSIGNORS TO REEVES & CO., OF SAME PLACE.

THRASHING-MACHINE.

SPECIFICATION forming part of Letters Patent No. 550,027, dated November 19, 1895.

Application filed September 5, 1895. Serial No. 561,490. (No model.)

*To all whom it may concern:*

Be it known that we, MARSHAL T. REEVES, JOHN N. KAILOR, and JAMES N. D. REEVES, citizens of the United States, residing at Columbus, in the county of Bartholomew and State of Indiana, have invented a new and useful Thrashing-Machine, of which the following is a specification.

Our invention relates to an improvement in the separating mechanism of a thrashing-machine.

The object of our improvement is to provide means whereby the grain, after leaving the thrashing-cylinder, may be properly and uniformly distributed upon the first or primary separating-table.

The accompanying drawings illustrate our invention.

Figure 1 is a sectional side elevation on line 1 1, Fig. 2, of the front end of a thrashing-machine embodying our invention. Fig. 2 is a plan on the line 2 2, Fig. 1. Fig. 3 is a side elevation of one of the diagonal spreaders; and Fig. 4 is an end elevation of said spreader, the end disk having been removed.

In the drawings, 5 indicates the thrashing-cylinder shaft, 6 the thrashing-cylinder, and 7 the co-operating concave, said parts being of any ordinary construction. Placed below the thrashing-cylinder is the usual separating-table 8, supported by two pairs of links 9 9, and to the rear of this table is a similar separating-table 10.

The rear end of the concave 7 lies immediately below the center of the cylinder 6, and secured to said concave at its rear end is a bar 11, to which is secured a series of rods or wires 12, which extend upwardly and rearwardly for the greater portion of their length and then curve downwardly, as shown in Fig. 1. The rods 12 thus form a grid, upon which the thrashed grain is received as it issues from the thrashing-cylinder.

The straw, grain-heads, and kernels are thrown from the thrashing-cylinder with great force toward the rear end of the separating-table 8, much of the material passing even beyond the end of said table and falling upon table 10. It is necessary, to insure the proper separation of the grain, that the thrashed straw be forced to travel substantially the entire length of the table 8, and for this purpose at some distance to the rear and just above the center of the thrashing-cylinder a retarding-beater 13 is placed, said beater being revolved in the same direction as the thrasher-cylinder. A small retarding-beater 14, revolving in an opposite direction to the thrashing-cylinder, lies immediately below the downturned ends of rods 12, said rods passing a short distance beyond the center of the beater. Rods 12 are thus extended, so that material cannot be forced between the beater 14 and rods 12 by beater 13. Cylinder 6 and beaters 13 and 14 are so relatively placed that no tangent of the cylinder can pass between the beaters. This relative position is very important, because unless it exists the grain may be thrown between the beaters and far up toward the rear of the separating-table.

Beater 14 is composed of a central shaft 16, upon which are secured two disks 17, and a piece of sheet metal 18, surrounding the shaft and secured to the disks 17. The sheet 18 is doubled upon itself in several places to form outstanding arms 19. By this construction a very light, strong, and inexpensive beater is formed.

After the thrashed straw passes from under the beater 13 it lies in a mass in the center of the table 8, and in order to spread it uniformly over the said table the diagonal spreaders 20 and 21 are placed parallel thereto and to the rear of said beater 13. Said spreaders are provided at their adjacent ends with intermeshing gears 22 and 23, and said inner ends are supported upon shafts resting in hangers 24. One of the spreaders—spreader 21 in the machine shown—is provided at its outer end with a gear 25, one portion of the face of which extends through the thrasher-casing and meshes with a gear 26, carried by a stud-shaft secured to the said thrasher-casing. Gear 26, and hence spreaders 20 and 21, are driven in the same direction as beater 13 by means of sprocket 27, secured to the gear, sprocket 28, secured to the beater-shaft, and chain 29. Spreaders 20 and 21 are each provided with several series of projecting teeth 30, each series being mounted upon or formed integral with a bar 31, said bar being secured to the spreaders by means of screws 32, passing through slots 33 in said bar. In ordinary use the teeth of the different series are staggered; but owing to slots 33 the teeth of each series may be disposed in any desired position longitudinally of the spreaders, thus adapting said spreaders to various grades of grain. Teeth 30 being mounted upon detachable bars, as shown, may be easily removed from the spreader-drums and finer or coarser teeth or teeth of different length may be substituted and adjusted to suit the different grades of grain.

In operation the grain as it leaves the thrashing-cylinder and concave is thrown in various directions tangentially to the said cylinder and concave out into the separating-chamber. The smaller portions are forced through the grid between the rods 12 and fall upon the separating-table or strike the beater 14. In the latter case the material either rebounds and falls upon the table 8 or is carried around by the buckets of the beater and deposited upon the said table, in either case the material being deposited upon the separating-table near its front end. The material which is forced along the grid, or that which is thrown in an upward direction from the cylinder, is caught by the arms of beater 13 and thrown downward upon the separating-table. Owing to the relative positions of the cylinder and the two beaters it is impossible for any material to pass in a tangential line from the cylinder to the table 8 between the beaters, and therefore all of the material which passes from the cylinder is forced by one beater or the other to fall upon the forward end of the separating-table, and a proper separation of the grain is thereby insured. As the material passes from under beater 13 it is spread by spreaders 20 and 21, so as to form a thin layer over the entire surface of the upper portion of the separating-table.

We claim as our invention—

1. In a thrashing machine, the combination with the cylinder, concave, and separating table, of two retarding beaters, one of said beaters being placed to the rear of and above the center of the thrashing cylinder and revolving in the same direction as said cylinder, and the other of said beaters being placed to the rear of and below the center of the cylinder, and revolving in the opposite direction, the said beaters being so relatively placed that no material may be forced from the cylinder toward the table without encountering one of said beaters, a grid extending from the concave to and embracing the upper portion of the lower beater, the diagonally placed spreader drums located to the rear of the thrashing cylinder and provided with several series of projecting teeth, each of said series being adjustable longitudinally of the spreader drums, substantially as described.

2. In a thrashing machine, the diagonal spreader drums located to the rear of the thrashing cylinder, and provided with several series of projecting teeth, each of which series may be adjusted longitudinally of the spreader drums, substantially as described.

3. In a thrashing machine, the diagonal spreader drums located to the rear of the thrashing cylinder, and provided with several series of projecting teeth, each of said series being mounted upon, or formed integral with, a bar provided with longitudinal slots, said bar being secured to the spreader drum by means of bolts passing through the said slots, substantially as set forth.

4. In a thrashing machine, a retarding beater composed of a central shaft, two disks secured to said shaft near the ends thereof, and a piece of sheet metal, surrounding the shaft and extending from one disk to the other and secured thereto, said metal sheet being doubled upon itself in several places to form outwardly extending arms, substantially as described.

MARSHAL T. REEVES.
JOHN N. KAILOR.
JAMES N. D. REEVES.

Witnesses:
HARRY O. WAY,
HARRY G. SCHOWE.